United States Patent [19]

Sayiner

[11] Patent Number: 6,097,321
[45] Date of Patent: Aug. 1, 2000

[54] PUNCTURED MAXIMUM TRANSITION RUN CODE, APPARATUS AND METHOD FOR PROVIDING THE SAME

[75] Inventor: Necip Sayiner, Allentown, Pa.

[73] Assignee: Lucent Technologies, Inc., Murray Hill, N.J.

[21] Appl. No.: 09/069,822

[22] Filed: Apr. 30, 1998

[51] Int. Cl.[7] .................................................. H03M 7/00
[52] U.S. Cl. ............................................. 341/59; 341/94
[58] Field of Search ........................................ 341/59, 94

[56] References Cited

U.S. PATENT DOCUMENTS

| 5,731,768 | 3/1998 | Tsang ........................................ 341/59 |
| 5,859,601 | 1/1999 | Moon et al. ............................... 341/59 |
| 5,949,357 | 9/1999 | Fitzpatrick et al. ....................... 341/68 |

OTHER PUBLICATIONS

Kelly Knudson Fitzpatrick and Cory S. Modlin, "Time-varying MTR codes for High Density Magnetic Recording", ICC 1997, Nov. 1997.

Paul H. Siegel, "Distance–Enhancing Codes For Digital Recording", Digests of the Magnetic Recording Conference Sep. 8–10, 1997.

*Primary Examiner*—Brian Young
*Assistant Examiner*—Jason L W Kost

[57] ABSTRACT

A punctured maximum transition run (PMTR) code includes transition-allowed bit slots and transition-disallowed bit slots. Each of the transition-allowed bit slots is a bit slot in which a bit representing a third consecutive transition of a logic signal can occur whereas each of the transition-disallowed bit slots is a bit slot in which a bit representing a third consecutive transition of a logic signal cannot occur. There are at least two transition-allowed bit slots which are adjacent to each other. The transition occurs from a high logic level to a low logic level, or from a low logic level to a high logic level.

34 Claims, 2 Drawing Sheets

FIG. 1A
(PRIOR ART)

| | | | | | | |
|---|---|---|---|---|---|---|
| I: | 1 | 1 | -1 | 1 | 1 | 2 CONS. TRANS. |
| | 1 | -1 | 1 | -1 | 1 | 4 CONS. TRANS. |
| II: | -1 | 1 | -1 | 1 | -1 | 4 CONS. TRANS. |
| | -1 | -1 | 1 | -1 | -1 | 2 CONS. TRANS. |
| III: | -1 | 1 | -1 | 1 | 1 | 3 CONS. TRANS. |
| | -1 | -1 | 1 | -1 | 1 | 3 CONS. TRANS. |
| IV: | 1 | 1 | -1 | 1 | -1 | 3 CONS. TRANS. |
| | 1 | -1 | 1 | -1 | -1 | 3 CONS. TRANS. |

FIG. 1B
(PRIOR ART)

| | | | | | | |
|---|---|---|---|---|---|---|
| III: | -1 | 1 | -1 | 1 | 1 | 3RD TRANSITION ENDING AT TIME J (EVEN) |
| | -1 | -1 | 1 | -1 | 1 | 3RD TRANS. ENDING AT TIME J + 1 (ODD) |
| IV: | 1 | 1 | -1 | 1 | -1 | 3RD TRANS. ENDING AT TIME J + 1 (ODD) |
| | 1 | -1 | 1 | -1 | -1 | 3RD TRANS. ENDING AT TIME J (EVEN) |

FIG. 3
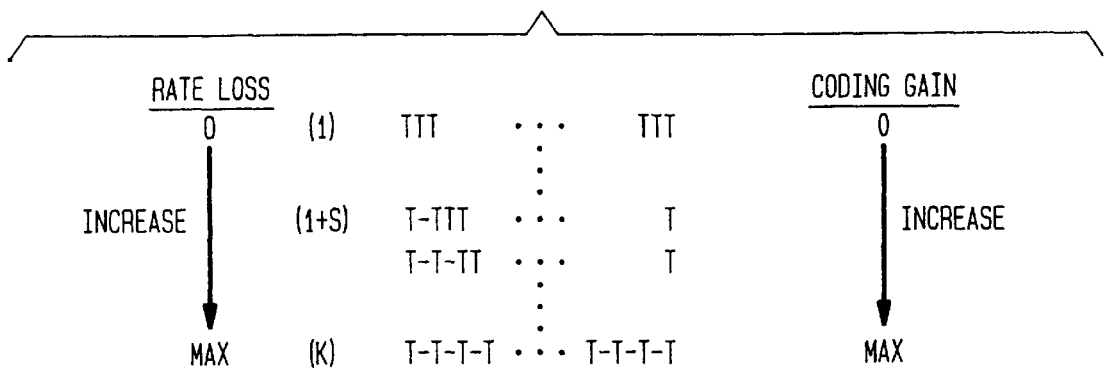
FIG. 4
TTTT--TT-T-T-T-TT
FIG. 5A
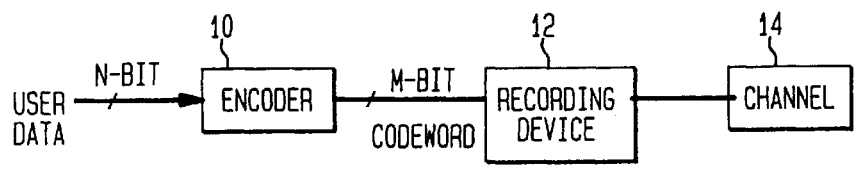
FIG. 5B
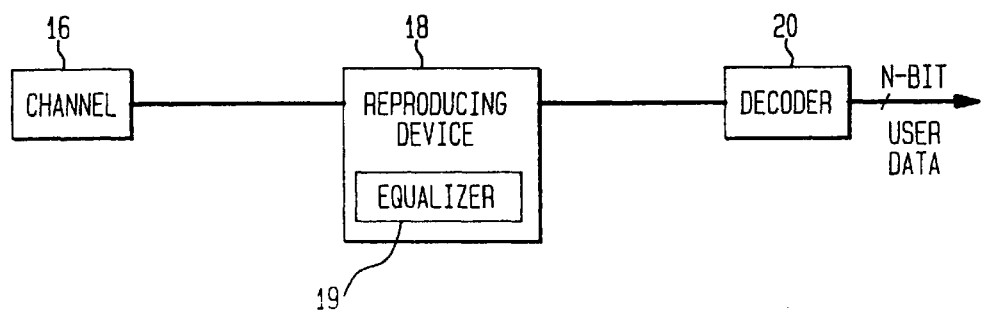

PUNCTURED MAXIMUM TRANSITION RUN CODE, APPARATUS AND METHOD FOR PROVIDING THE SAME

BACKGROUND OF THE INVENTION

1. Field of the Invention

The present invention relates to Maximum Transition Run (MTR) codes and, more particularly, to Punctured MTR (PMTR) codes with an increased coding gain and an improved bit error rate, and an apparatus and method for providing the PMTR codes.

2. Description of Prior Art

In magnetic recording and reproducing systems, the process of encoding user input data to generate codewords to be stored on a recording medium is known as modulation encoding. In modulation encoding, user input data is converted to a codeword using a one-to-one mapping scheme. Generally, these codewords have additional bits compared to the bit size of the user input data. Modulation encoding helps to minimize errors from arising in the system due to noise in the communication channel.

Run-Length Limited (RLL) codes are one type of codes provided by using the modulation encoding technique. RLL codes, generally used in hard disc drives, have a code rate of "n/m" where "n" is an integer multiple or submultiple of 8 and "m" is an integer greater than "n". Generally, n-bit user data is input to an encoder and encoded into an m-bit codeword or channel data by the modulation encoding technique.

RLL codes have run length constraints that are represented using a condition (d, k), where "d" represents the minimum length of running 0's (or 1's) and "k" represents the maximum length of running 0's (or 1's). For example, a RLL code (0, 6) means that the code must have the minimum length of zero 0's and the maximum number of six 0's. Generally, RLL codes having a bit rate of 8/9, 16/17 and 24/25 are used in magnetic recording systems. In a 16/17 rate RLL code, 16-bit user data is input to an encoder and 17-bit codeword is output as channel data with a high efficiency of 0.94 (=16/17) or a rate loss of about 6%. However, such a RLL code results in minimum distance error-events. Minimum distance error events are described below in more detail.

In providing channel data to be recorded on a recording medium, e.g., magnetic disc, user input data is encoded into codewords and the codewords are recorded on the recording medium. Using a reproduction device, the recorded codewords are reproduced from the recording medium and decoded to generate original user data. An error event occurs when the recorded codewords having predetermined code sequences differ from the detected codewords. In order to improve system performance in magnetic recording using disc drive systems, certain code sequences which can result in such error events need to be eliminated.

Minimum distance error-events are known as most likely error-events having high probability of occurrence or as dominant error-events. The term, "minimum distance error-event" is used interchangeably with the term, "dominant error-event". It is desirable to increase the distance of minimum distance error-events to decrease the likelihood of such error-events. Although RLL codes offer a low rate loss, RLL codes are more prone to dominant error-events. Codes with dominant error-events (i.e., lacking distance enhancing properties) have no or low coding gain. Therefore, a group of codes that have distance enhancing properties, i.e., removing certain sequences from the code table that can result in minimum distance error-events, are needed.

Maximum transition run (MTR) codes have been proposed as a class of modulation codes designed to provide such distance enhancing properties. The MTR codes have been suggested to provide a coding gain necessary for high density magnetic recording. Generally, a standard MTR code provides a coding gain, i.e., avoids minimum distance error-events, at high densities by imposing a constraint that the codes to be recorded on a medium must not have more than two consecutive transitions or some other effective means of achieving the same goal. An example of such a standard MTR code is discussed below.

Symbols "1" and "−1" as shown in FIG. 1A represent two levels of a logic signal to be recorded on a recording medium. For example, a code sequence of "1 −1" or "1 1" has one transition therein, and a code sequence of "1 −1" has two consecutive transitions where the first transition occurs from "1" to "−1" and the second transition from "−1" to "1". In high density recording, one of the dominant error-events is mistaking −1 1 −1 recorded on a recording medium as 1 −1 1 when the recorded data is detected, or mistaking 1 −1 1 recorded on the medium as −1 1 −1. A set of MTR constraints to eliminate such dominant error-events from all possible code sequences is discussed in an article entitled "Time-varying MTR Codes for High Density Magnetic Recording", ICC 97, November 1997. In the article, four possible cases of dominant error-events as shown in FIG. 1A are discussed.

In FIG. 1A, five bit slots are shown; however, these code sequences can be found in a larger bit-size code. The cases I–IV represent possible codeword sequences which could result in the dominant error-events. All possible levels for the bits preceding and following the code sequence "1 −1 1" or "−1 1 −1" in the first and fifth bit slots are covered by the four cases.

As shown in FIG. 1A, each of the cases I–IV has a pair of code sequences. When one of the two sequences in each of the cases I–IV is recorded and the other sequence is detected, a dominant error-event occurs. Therefore, at least one of the two sequences in the cases I–IV needs to be eliminated from the code table to avoid occurrence of dominant error-events. By imposing a constraint that no three consecutive transitions are allowed in a code sequence, at least one of the two sequences in each of the cases I–IV is eliminated. This type of standard MTR code provides a coding gain.

For higher capacity recording, another type of MTR constraint, known as a time-varying MTR constraint, is proposed in the article. In the time-varying MTR codes, at most three consecutive transitions are allowed such that the cases I and II are eliminated. In the cases III and IV, it is observed that three consecutive transitions end at even or odd bit slots, as shown in FIG. 1B. By imposing a constraint that no four consecutive transitions are allowed and that no three consecutive transitions ending in even bit slots are allowed, dominant error-events for high density recording can be eliminated and MTR codes with distance enhancing properties are provided.

FIG. 2 illustrates an example of a 8/9 rate MTR code with such a constraint condition. "A" represents a transition allowed in the bit slot marked with "A. As shown in FIG. 2, this 8/9 MTR code eliminates minimum distance error-events by:

1) allowing at most two transitions in the first and second bit slots of the 9-bit codeword taking into consideration the previous codeword, 2) allowing at most one transition in the last bit slot of the 9-bit codeword, and 3) allowing a third transition only in the bit slots marked with "A" in the 9-bit codeword.

All other code sequences for the 8/9 MTR code are eliminated to avoid dominant error-events. Using a computer simulation, the above constraints provide 267 possible codewords. Eleven more codewords can be removed for run-length constraint reasons which still results in 256 valid codewords needed to achieve a 8/9 code rate.

However, these MTR codes have a much lower data rate than RLL codes. For example, RLL coding provides a 16/17 rate code but MTR coding provides a 8/9 rate code with an additional 6% rate loss over the 16/17 RLL code. Due to the 6% rate loss, the channel data rate for the MTR codes has to be at least 6% greater than that for the RLL codes to compensate for the rate loss. This results in an increased noise bandwidth and a greater equalization loss. That is, any increase in the coding gain achieved by using the above-described MTR code is partially or fully offset by the rate loss of the MTR code. Accordingly, a channel code which provides sufficient coding gain with a minimum rate loss is needed, especially for high order partial response channels.

SUMMARY OF THE INVENTION

The present invention is directed to a punctured maximum transition run (PMTR) code and an apparatus and method of providing the same. The PMTR code includes transition-allowed bit slots and transition-disallowed bit slots. Each of the transition-allowed bit slots is a bit slot in which a bit representing a third consecutive transition of a logic signal can occur whereas each of the transition-disallowed bit slots is a bit slot in which a bit representing a third consecutive transition of a logic signal cannot occur. There are at least two transition-allowed bit slots which are adjacent to each other. The transition occurs from a high logic level to a low logic level, or from a low logic level to a high logic level.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein:

FIGS. 1A and 1B show examples of dominant error events in a conventional MTR code;

FIG. 2 shows an example of a constraint for a conventional 8/9 rate MTR code;

FIG. 3 shows examples of codes with a coding gain and rate loss according to the present invention;

FIG. 4 shows an example of a PMTR code according to the present invention;

FIG. 5A shows a channel data recording system in accordance with the embodiments of the present invention; and FIG. 5B shows a channel data reproducing system in accordance with the embodiments of the present invention.

DETAILED DESCRIPTION OF THE PREFERRED EMBODIMENTS

The following detailed description relates to punctured maximum transition run (PMTR) codes which typically provide an increased coding gain and a decreased rate loss, and an apparatus and method of providing the PMTR codes.

FIG. 3 shows a codebook (plurality of codewords) and its relation to rate loss and coding gain according to the present invention. Here, "T" represents a third consecutive transition (from high to low or low to high level). A bit slot marked with "T" indicates that a third consecutive transition is allowed to end only in that bit slot. That is, any third consecutive transition, if it occurs, must occur in the bit slots which are marked with "T". A bit slot marked with a dash "-" represents that a third consecutive transition is not allowed to end in that bit slot. As long as these constraints are obeyed, other transitions may occur in all the bit slots.

As shown in FIG. 3, different MTR codes (1) through (K) are used for a fixed rate user data. The code (1) has a "T" in every bit slot of the code such that a sequence of "TT . . . TTT" is formed. In the code (1), a third consecutive transition is allowed to end in every bit slot such that there is no rate loss when encoding the user input data. However, the code (1) is not desirable because it has zero coding gain. In other words, the code (1) has dominant error events and does not have any distance enhancing properties.

Consider the code (K). It allows a third consecutive transition (T) to end only in every odd bit slot and is represented as "T-T-T . . . T". Unlike the code (1), this code (K) offers a maximum coding gain, i.e., all the dominant error events have been removed from the code. However, the code (K) suffers from a maximum rate loss. Although the code (K) may be used in high density channel recording, a code with a lower rate loss is desired. The code (K) is similar to the MTR code shown in FIG. 2.

In order to obtain a code structure which has a suitable coding gain and low rate loss, the code (K) is "punctured" to selectively allow "T" in bit slots which have been marked with a dash "-", previously. By increasing the number of consecutive Ts, the likelihood of error-events increases such that the coding gain decreases. On the other hand, as the number of consecutive Ts increases, the rate loss decreases because the total number of possible codewords increases.

Therefore, the PMTR code according to the present invention balances the coding gain and the rate loss of a code for the system. As an example of puncturing, in the code (1+S), "T" replaces the dash "-" in the fourth bit slot, allowing a third consecutive transition to end only in that bit slot and other bit slots marked with "T". Computer simulation techniques are then used to determine the total number of possible codewords allowed given the restraint. In other words, different code structures (2 through K−1) with varying coding gains and varying rate losses are designed according to the present invention by puncturing the code sequence (K). Among the different code structures, a code structure which provides the sufficient coding gain and low rate loss as needed by the system can be selected.

FIG. 4 shows an example of such a PMTR code in a 17-bit codeword. As shown therein, a third consecutive transition is permitted to end only in the bit slots 1–4, 7, 8, 10, 12, 14, 16 and 17. With this code, 65,936 different codewords are provided which is greater than the number of 65,536 (=$2^{16}$) codewords needed to achieve the 16/17 code rate. Compared to the MTR code (1) in FIG. 3, this PMTR code has a bit error rate that is improved by a factor of about 3. Although one example is shown, other PMTR codes with different codeword length and code rate are contemplated by applying the puncturing technique described hereinabove.

Accordingly, the PMTR coding according to the present invention provides channel data with a high coding gain and low rate loss, significantly improves accuracy and reliability in the process of magnetic/optical recording and reproducing the channel data, and provides system stability and performance enhancement. Furthermore, the PMTR improves the bit error rate considerably.

Use of the PMTR coding technique in accordance with the embodiments of the present invention is described below. FIG. 5A shows a recording process of PMTR codewords according to the present invention whereas FIG. 5B shows a reproduction process of the PMTR codewords according to the present invention. Although recording and reproduction systems are shown in separate figures, it is contemplated that one system can incorporate or integrate both systems. In other words, the channels 14 and 16 may be the same. Further, an integrated circuit including an encoder 10 and/or a decoder 20, and any other elements as needed, can be used. The encoder 10 and decoder 20 can be implemented using a plurality of logic gates, registers, or the like, which function as a look-up table to provide a one-to-one mapping scheme.

As shown in FIG. 5A, n-bit user data is input to the encoder 10 so that the user data is modulation encoded to provide channel data. The encoded m-bit codeword (channel data) from the encoder 10 is recorded on a channel 14, such as a medium, e.g., magnetic disc, optical disc, tape, semiconductor memory, or other suitable storing means, through a recording device 12. The recording device 12 can include optical heads, magnetic heads, or other writing heads, and a signal processing circuit including scrambling/descrambling and encryption/decryption circuits known in the art. Any suitable recording means can be used as the recording device 12.

In the encoder 10, the n-bit user data is encoded according to the PMTR coding technique according to the present invention described above. For example, constraints of the PMTR code shown in FIG. 4 can be used by the encoder 10 to generate codewords which are suitable for high density channel recording. The encoder 10 can also be designed to implement other PMTR code constraints for varying codeword length and code rate. It is also contemplated that the user data and/or codewords can be processed by other means prior to being encoded or recorded on the channel 14.

In a reproduction system as shown in FIG. 5B, m-bit codewords are read from a channel 16. As described above, the channel 16 is a medium which stores codewords therein, e.g., disc, tape, memory, semiconductor memory, or other suitable storing means. The stored codewords are reproduced by a reproducing device 18 and input to the decoder 20. The reproducing device 18 includes magnetic heads, optical heads, or other suitable reading means, and a signal processing circuit. An equalizer 19 is used to shape the waveform reproduced from the medium to improve the quality of the waveform. Here, the equalizer 19 is shown to be included in the reproducing device 18; however, a separate equalizer can be used to process the signal reproduced by a reading head.

The equalizer 19 applies partial response equalization on the detected codeword. Partial response equalization allows production of information without removing intersymbol interferences caused by transfer characteristics of a recording/reproduction system. Different types of partial response equalization, such as, PR4 (class 4 partial response), EPR4 (extended class 4 partial response), $E^2$PR4 ($E^2$ class 4 partial response) and so forth, can be used. Types of minimum distance error-events can differ based on the type of partial response equalization used. After the partial response equalization, the decoder 20 outputs original n-bit user data. In the decoder 20, the detected codewords are restored to the original user data using a look up table or the like under the one-to-one mapping scheme and the original n-bit user data is output.

The PMTR codes and method of forming the same according to the present invention allows high density channel recording and reproduction. Compared to RLL codes, the PMTR codes provide higher coding gain. Compared to conventional MTR codes, the PMTR codes provide a lower rate loss or bit error rate. That is, the PMTR codes provide both a higher coding gain and a lower rate loss. Therefore, they improve system performance and reliability. The PMTR codes and PMTR coding techniques are useful for magnetic recording of read channels, but can also be used in other areas, e.g., wireless transmissions, modem applications, or other suitable systems.

The invention being thus described, it will be obvious that the same may be varied in many ways. Such variations are not to be regarded as a departure from the spirit and scope of the invention, and all such modifications are intended to be included within the scope of the following claims.

What is claimed:

1. A method of encoding user data, comprising the steps of:

providing a base code having transition-allowed bit slots and transition-disallowed bit slots, each of the transition-allowed bit slots being a bit slot in which a bit representing a third consecutive transition of a logic signal can occur, each of the transition-disallowed bit slots being a bit slot in which a bit representing a third consecutive transition of a logic signal cannot occur, each transition being a change in logic level of the logic signal, and said base code having no two transition-allowed bit slots adjacent to each other; and changing at least one of said transition-disallowed bit slots to a transition-allowed bit slot such that at least two transition-allowed bit slots are adjacent to each other and at least one transition-disallowed bit slot remains in a changed code.

2. The method of claim 1, wherein in said providing step, each transition is from a high logic level to a low logic level, or from a low logic level to a high logic level.

3. The method of claim 1, wherein the base code has 17 bit slots and is represented as:

T-T-T-T-T-T-T-T-T wherein "T" represents the transition-allowed bit slot, and "-" represents the transition-disallowed bit slot; and said changing step changes second, fourth, eighth, tenth, twelfth, fourteenth and sixteenth bit slots of the base code to the transition-allowed bit slots.

4. The method of claim 3, further comprising:

changing fifth, ninth, eleventh, thirteenth, and fifteenth bit slots of the base code to the transition-disallowed bit slots.

5. A recording system comprising:

an encoder receiving user data and encoding the user data into a code, the code having transition-allowed bit slots and transition-disallowed bit slots, at least two transition-allowed bit slots being adjacent to each other, each of the transition-allowed bit slots being a bit slot in which a bit representing a third consecutive transition of a logic signal can occur, each of the transition-disallowed bit slots being a bit slot in which a bit representing a third consecutive transition of a logic signal cannot occur, each transition being a change in a logic level of the logic signal; and a recording unit coupled to the encoder and recording the code on a medium.

6. The recording system of claim 5, wherein the code has 17 bit slots and ten out of the 17 bit slots are the transition-allowed bit slots.

7. The recording system of claim 6, wherein first through fourth, seventh, eighth, tenth, twelfth, fourteenth, sixteenth and seventeenth bit slots of the code are the transition-allowed bit slots.

8. The recording system of claim 5, wherein each transition is from a low logic level to a high logic level, or from a high logic level to a low logic level.

9. A reproducing system comprising:
a reproducing unit detecting a code from a medium, the code having transition-allowed bit slots and transition-disallowed bit slots, at least two transition-allowed bit slots being adjacent to each other, each of the transition-allowed bit slots being a bit slot in which a bit representing a third consecutive transition of a logic signal can occur, each of the transition-disallowed bit slots being a bit slot in which a bit representing a third consecutive transition of a logic signal cannot occur, each transition being a change in a logic level of the logic signal; and
a decoder coupled to the reproducing unit and decoding the code to generate user data.

10. The reproducing system of claim 9, wherein the code has 17 bit slots and ten out of the 17 bit slots are the transition-allowed bit slots.

11. The reproducing system of claim 10, wherein first through fourth, seventh, eighth, tenth, twelfth, fourteenth, sixteenth and seventeenth bit slots of the code having 17 bit slots are the transition-allowed bit slots.

12. The reproducing system of claim 9, wherein the reproducing unit includes an equalizer for partial response equalizing the detected code.

13. The reproducing system of claim 9, wherein each transition is from a high logic level to a low logic level, or from a low logic level to a high logic level.

14. A medium for storing data accessible by a signal processing system, comprising:
a data structure stored in said medium, said data structure including a code, the code having transition-allowed bit slots and transition-disallowed bit slots, at least two transition-allowed bit slots being adjacent to each other, each of the transition-allowed bit slots being a bit slot in which a bit representing a third consecutive transition of a logic signal can occur, each of the transition-disallowed bit slots being a bit slot in which a bit representing a third consecutive transition of a logic signal cannot occur, each transition being a change in a logic level of the logic signal.

15. The medium of claim 14, wherein said signal processing system processes said code of the data structure and generates a data signal.

16. The medium of claim 15, wherein said data signal includes a propagating signal wave.

17. The medium of claim 14, wherein the code stored in the medium has 17 bit slots, and the code is represented as:

TTTT--TT-T-T-T-TT wherein "T" represents the transition-allowed bit slot, and "-" represents the transition-disallowed bit slot.

18. The medium of claim 14, wherein said code stored in the medium has 17 bit slots and ten out of said 17 bit slots are the transition-allowed bit slots.

19. The medium of claim 14, wherein each transition is from a high logic level to a low logic level, or from a low logic level to a high logic level.

20. The medium of claim 14, wherein the medium is a magnetic medium.

21. A data signal recordable to a medium or reproducible from the medium, comprising:
a code segment including a codeword, the codeword having transition-allowed bit slots and transition-disallowed bit slots, at least two transition-allowed bit slots being adjacent to each other, each of the transition-allowed bit slots being a bit slot in which a bit representing a third consecutive transition of a logic signal can occur, each of the transition-disallowed bit slots being a bit slot in which a bit representing a third consecutive transition of a logic signal cannot occur, each transition being a change in a logic level of the logic signal.

22. The data signal of claim 21, wherein the codeword has 17 bit slots and is represented as:

TTTT--TT-T-T-T-TT wherein "T" represents the transition-allowed bit slot, and "-" represents the transition-disallowed bit slot.

23. The data signal of claim 21, wherein the codeword has 17 bit slots and ten out of the 17 bit slots are the transition-allowed bit slots.

24. The data signal of claim 21, wherein each transition is from a high logic level to a low logic level, or from a low logic level to a high logic level.

25. An integrated circuit comprising:
an encoder receiving user data and encoding the user data into a code, said code having transition-allowed bit slots and transition-disallowed bit slots, at least two transition-allowed bit slots being adjacent to each other, each of the transition-allowed bit slots being a bit slot in which a bit representing a third consecutive transition of a logic signal can occur, each of the transition-disallowed bit slots being a bit slot in which a bit representing a third consecutive transition of a logic signal cannot occur, each transition being a change in a logic level of the logic signal.

26. The integrated circuit of claim 25, wherein the code has 17 bit slots and ten out of the 17 bit slots are the transition-allowed bit slots.

27. The integrated circuit of claim 26, wherein first through fourth, seventh, eighth, tenth, twelfth, fourteenth, sixteenth and seventeenth bit slots of the code are the transition-allowed bit slots.

28. The integrated circuit of claim 25, wherein each transition is from a low logic level to a high logic level, or from a high logic level to a low logic level.

29. The integrated circuit of claim 25, further comprising:
a decoder decoding the code.

30. An integrated circuit comprising:
a decoder receiving a code from a medium and decoding the code, the code having transition-allowed bit slots and transition-disallowed bit slots, at least two transition-allowed bit slots being adjacent to each other, each of the transition-allowed bit slots being a bit slot in which a bit representing a third consecutive transition of a logic signal can occur, each of the transition-disallowed bit slots being a bit slot in which a bit representing a third consecutive transition of a logic signal cannot occur, each transition being a change in a logic level of the logic signal.

31. The integrated circuit of claim 30, wherein the code has 17 bit slots and ten out of the 17 bit slots are the transition-allowed bit slots.

32. The integrated circuit of claim 31, wherein first through fourth, seventh, eighth, tenth, twelfth, fourteenth, sixteenth and seventeenth bit slots of the code having 17 bit slots are the transition-allowed bit slots.

33. The integrated circuit of claim 30, further comprising:
an encoder receiving user data and encoding the user data to provide the code.

34. The integrated circuit of claim 30, wherein each transition is from a high logic level to a low logic level, or from a low logic level to a high logic level.

* * * * *